US 6,639,633 B2

(12) United States Patent
Song et al.

(10) Patent No.: US 6,639,633 B2
(45) Date of Patent: Oct. 28, 2003

(54) LIQUID CRYSTAL DISPLAY DEVICE HAVING A STORAGE CAPACITOR

(75) Inventors: In-Duk Song, Kyoungsangbuk-do (KR); Geon-Tae Kim, Kyoungsangbuk-do (KR)

(73) Assignee: LG. Philips LCD Co. LTD, Seoul (KR)

( * ) Notice: Subject to any disclaimer, the term of this patent is extended or adjusted under 35 U.S.C. 154(b) by 182 days.

(21) Appl. No.: 09/870,722

(22) Filed: Jun. 1, 2001

(65) Prior Publication Data

US 2002/0008794 A1 Jan. 24, 2002

(30) Foreign Application Priority Data

Jun. 1, 2000 (KR) .......................... 2000-30189

(51) Int. Cl.[7] ............................. G02F 1/1333
(52) U.S. Cl. ..................... 349/40; 349/49; 349/139
(58) Field of Search ..................... 349/40, 139, 49

(56) References Cited

U.S. PATENT DOCUMENTS

| | | | | |
|---|---|---|---|---|
| 5,220,443 A | * | 6/1993 | Noguchi | 349/40 |
| 5,684,546 A | * | 11/1997 | Kim | 349/40 |
| 5,691,787 A | * | 11/1997 | Shimada et al. | 349/40 |
| 5,949,502 A | * | 9/1999 | Matsunaga et al. | 349/40 |
| 6,088,073 A | * | 7/2000 | Hioki et al. | 349/40 |
| 6,333,769 B1 | * | 12/2001 | Suzuki et al. | 349/40 |

* cited by examiner

Primary Examiner—Carl Whitehead, Jr.
Assistant Examiner—Thanh Nguyen
(74) Attorney, Agent, or Firm—Birch, Stewart, Kolasch & Birch, LLP

(57) ABSTRACT

The present invention discloses a liquid crystal display device, including: a first substrate; a second substrate spaced from the first substrate, having gate lines arranged in a first direction, data lines arranged in a direction perpendicular to the gate lines, capacitor electrode lines arranged in a direction parallel to the gate lines, each of the gate lines having an electrostatic circuit located on a second end portion thereof, a first end portion of the gate lines having a pad portion, each of the capacitor electrode lines having an electrostatic circuit located on a first end portion thereof, second end portions of the capacitor electrode lines being electrically connected with each other; a liquid crystal layer interposed between the first and second substrate; a gate driver being electrically connected with the gate lines through the pad portion of the gate lines; and a data drivers being electrically connected with the data lines, wherein the electrostatic circuit of the gate line electrically separates the second end portions of the gate lines from each other, and the electrostatic circuit of the capacitor electrode lines electrically separates the second end portions of the capacitor electrode lines from each other.

16 Claims, 5 Drawing Sheets

LIQUID CRYSTAL DISPLAY DEVICE HAVING A STORAGE CAPACITOR

CROSS REFERENCE

This application claims the benefit of Korean Patent Application No. 2000-30189, filed on Jun. 1, 2000, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a capacitor electrode of a storage capacitor for use in a LCD device.

2. Description of Related Art

In general, LCD devices have various advantages including being thin in thickness and low in power consumption, and so on, in comparison with CRT (cathode ray tube) display devices. Therefore, such LCD devices might be expected to be substituted for CRT display devices and have been a matter of great interest in some industry fields.

FIGS. 1A and 1B are schematic views illustrating a typical liquid crystal display (LCD) device. As shown in FIG. 1A, the LCD device 11 includes first and second substrates 5 and 22, and an interposed liquid crystal layer 14 having liquid crystal molecules therebetween. The first substrate 5 as an upper substrate includes a color filter 7 and a transparent common electrode 18 formed against the color filter 7. The second substrate 22 as a lower substrate includes pixel regions "P", pixel electrodes 17 formed on the pixel regions "P", gate lines 13 arranged in a transverse direction, data lines 15 arranged in a perpendicular direction to the gate lines 13, and thin film transistors (TFTs) "T" arranged near crossing points of the gate and data lines 13 and 15.

Each TFT "T" includes an active layer 36, a gate electrode 35, and source and drain electrodes 31 and 33. The gate electrode 35 contacts with the gate line 13 and the source electrode contacts 31 with the data lines 15. Also, the drain electrode 33 contacts with the pixel electrode 17. The pixel electrode 17, an insulating layer (not shown) and the gate line 13, which are stacked in the above-described order, form a storage capacitor (not shown).

Further, the storage capacitor may be formed by adding a capacitor electrode 37. In other words, as shown in FIG. 2, the pixel electrode 17, the insulating layer (not shown) and the capacitor electrode 37, which are stacked in above-described order, form the storage capacitor "C". The capacitor electrodes 17 are equidistantly arranged in a direction parallel to the gate line 13.

FIG. 3 shows a conventional in-plane switching (IPS) type LCD device. As shown in FIG. 3, in the conventional IPS type LCD device, the pixel electrode 17 and the common electrode 18 are arranged on the same substrate, i.e., the lower substrate, and branches 17a of the pixel electrode 17 are interposed between branches 18a of the common electrode 18. Further, the pixel electrode 17, an insulating layer (not shown) and the gate line 13, which are stacked in the above-described order, form a storage capacitor "C". When a voltage is applied to the pixel electrode 17 and the common electrode 18, a parallel electric field is formed. The parallel electric field operates liquid crystal molecules.

FIG. 4 shows a conventional LCD device having a storage capacitor shown in FIG. 2. The storage capacitor having a structure shown in FIG. 2 is formed on the pixel region and usually uses a separate capacitor electrode line to apply a voltage. A voltage that is applied to the storage capacitor is obtained by using a common voltage that is applied to the upper substrate or by supplying a separate capacitor voltage. The storage capacitor shown in FIG. 4 does not use a separate voltage and uses a common voltage as a capacitor voltage by connecting the capacitor electrode line with the common electrode line.

As shown in FIG. 4, the upper substrate 5 has a common electrode (reference 18 of FIG. 1), and the lower substrate 22 includes the gate lines 13 arranged in a transverse direction and the data lines (not shown) arranged in a direction perpendicular to the gate lines 13. The lower substrate 22 further includes the capacitor electrode lines 37 equidistantly arranged in a direction parallel to the gate lines 13. Both terminals of the capacitor electrode lines 37 are electrically connected with each other, respectively. The gate lines 13 are connected with a gate driver 57 transferring signals through a gate pad 41. The data lines (not shown) are connected with a data driver 59 transferring signals through a data pad (not shown).

The gate and data drivers 57 and 59, in FIG. 4 are mounted on the tape carrier package (TCP), and the TCP having the gate driver is referred to as a gate TCP and the TCP having the data driver is referred to as a data TCP. A capacitor voltage may be usually supplied through either the gate TCP or the data TCP.

In FIG. 4, a capacitor voltage is supplied through the data TCP. The gate line 13 has an electrostatic circuit 62 at an end portion opposite to the gate pad 41. Though the electrostatic circuit 62 is connected with the capacitor electrode line 37, the gate line 13 is electrically independent of the capacitor electrode line 37 under a normal condition. However, when an overcurrent flows along the gate line 13 due to the static electricity, the gate line 13 and the capacitor electrode line 37 are electrically connected with each other by a static electricity across the electrostatic circuit 62. As a result, an equipotential is formed between the gate line 13 and the capacitor electrode line 37, thereby preventing a line open of the gate line 13 due to the static electricity.

The capacitor electrode line 37 is electrically connected with dot patterns 63 made of Ag paste, which are located at four corners of the lower substrate 22 for connection with the common electrode (not shown) of the upper substrate. Further, the capacitor electrode lines 37 are connected with an auxiliary capacitor electrode line 38, which is connected with the data drivers 59 via connecting lines 39.

In a storage capacitor having such a capacitor electrode line 37, when a capacitor voltage is applied to the capacitor electrode line 37 through the data drivers 59 respectively arranged on upper and lower regions of the lower substrate 22, a current flows in two direction, i.e., from both end portions to a central portion. A capacitor voltage level gets to be lowest at a central portion of the capacitor electrode line 37 due to a line resistance of the capacitor electrode line 37, and therefore a gray level becomes lowest at the central portion of the capacitor electrode line 37, whereby a central portion of a screen looks white or dark. That is, display characteristics of the LCD device vary according to the pixel position on the pixel matrix being considered.

FIG. 5 shows the IPS type LCD device shown in FIG. 3. As shown in FIG. 5, common electrode lines 18 of the IPS type LCD device are arranged in a direction parallel to the gate lines 13 just like the capacitor electrode line 37 of the LCD device shown in FIG. 4. When a capacitor voltage is applied to the common electrode line 18 from the data drivers 59 respectively arranged on upper and lower regions of the lower substrate 22, a current flows in two directions, i.e., from both end portions to a central portion. A capacitor voltage level gets to become lowest at a central portion of the common electrode line 18 due to its line resistance, a gray level becomes lowest at the central portion of the common electrode line 18, whereby a central portion of a screen looks white or dark. That is, display characteristics of the IPS type LCD device vary according to the pixel position being considered on the pixel matrix.

In other words, in case of a normally white state that a screen shows a black state when a voltage is applied to the liquid crystal layer, since a low voltage is applied to the central portions of the capacitor or common electrode lines, a arrangement state of the liquid crystal molecules is unstable or abnormal so that a light leakage occurs, leading to a white screen in the central portion of a screen. Further, in case of a normally black state that a screen shows a white state when a voltage is applied to the liquid crystal layer, since a low voltage is applied to the central portions of the capacitor or common electrode lines, a arrangement state of the liquid crystal molecules is unstable or abnormal and polarization state is unstable so that an amount of light emitted to the outside is reduced, leading to a black screen in the central portion of a screen.

For the foregoing reasons, there is a need for an LCD device that does not have the lowest gray level at the central portion of a screen, i.e., improved display characteristics that do not vary according to the pixel position being considered on the pixel matrix.

SUMMARY

To overcome the problems described above, preferred embodiments of the present invention provide a liquid crystal display (LCD) device having improved display characteristics.

A preferred embodiment of the present invention provide, in part, an LCD device that does not have the lowest gray level at the central portion of a screen i.e., that has display characteristics which do not vary according to the pixel position being considered on the pixel matrix.

In order to achieve the above object, the present invention provides (in part) a liquid crystal display device, including: a first substrate; a second substrate spaced from the first substrate, having gate lines arranged in a first direction, data lines arranged in a direction perpendicular to the gate lines, capacitor electrode lines arranged in a direction parallel to the gate lines, each of the gate lines having electrostatic circuits located on second end portions thereof, first end portions of the gate lines having pad portions, each of the capacitor electrode lines having electrostatic circuits located on second end portions thereof, first end portions of the capacitor electrode lines being electrically connected with each other; a liquid crystal layer interposed between the first and second substrates; gate driver units electrically connected with the gate lines through the pad portions of the gate lines; and data drivers units electrically connected with the data lines, wherein the electrostatic circuits of the gate lines electrically separate the second end portions of the gate lines from each other, and the electrostatic circuits of the capacitor electrode lines electrically separate the second end portions of the capacitor electrode lines from each other.

The second end portions of the capacitor electrode lines can be located opposite to the pad portions of the gate lines. The second substrate further includes pixel electrodes located on regions defined by the gate and data lines. The second substrate further includes insulating layers interposed between the capacitor electrode lines and the pixel electrode so that the capacitor electrode line, the insulating layer and the pixel electrode form a storage capacitor. The first substrate has a common electrode, and the second substrate has four dot patterns located on four corners thereof, wherein the four dot patterns are connected with the capacitor electrode lines and the common electrode of the first substrate. The dot pattern is made of Ag paste.

The present invention further provides (in part) a liquid crystal display device, including: a first substrate; a second substrate spaced apart from the substrate, having gate lines arranged in a first direction, data lines arranged in a direction perpendicular to the gate lines, common electrode lines arranged in a direction parallel to the gate lines, and pixel electrodes, the gate lines having electrostatic circuits located on first end portions thereof, second end portions of the gate lines having pad portions, the common electrode lines having electrostatic circuits located on first end portions thereof, second end portions of the common electrode lines being electrically connected with each other, the common electrode having branches, the pixel electrode having branches, the branches of the common electrode being equidistantly interposed between the branches of the pixel electrode; a liquid crystal layer interposed between the first and second substrate; gate driver units electrically connected with the gate lines through the pad portion of the gate lines; and data driver units electrically connected with the data lines, wherein the electrostatic circuits of the gate lines electrically separate the first end portions of the gate lines from each other, and the electrostatic circuits of the capacitor electrode lines electrically separate the first end portions of the capacitor electrode lines from each other.

The first end portions of the common electrode lines can be located opposite to the pad portions of the gate lines. The first substrate has a common electrode, and the second substrate has four dot patterns located on four corners thereof, wherein the four dot patterns are connected with the capacitor electrode lines and the common electrode of the first substrate. The dot pattern is made of Ag paste.

As described herein before, using an LCD device having a structure of a capacitor electrode line and a common electrode line according to the preferred embodiment of the present invention, since a gray level becomes lowest at the edge of a screen, display characteristics can be improved remarkably.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PROFFERED EMBODIMENTS

Reference will now be made in detail to the preferred embodiment of the present invention, example of which is illustrated in the accompanying drawings.

Figure 1A:
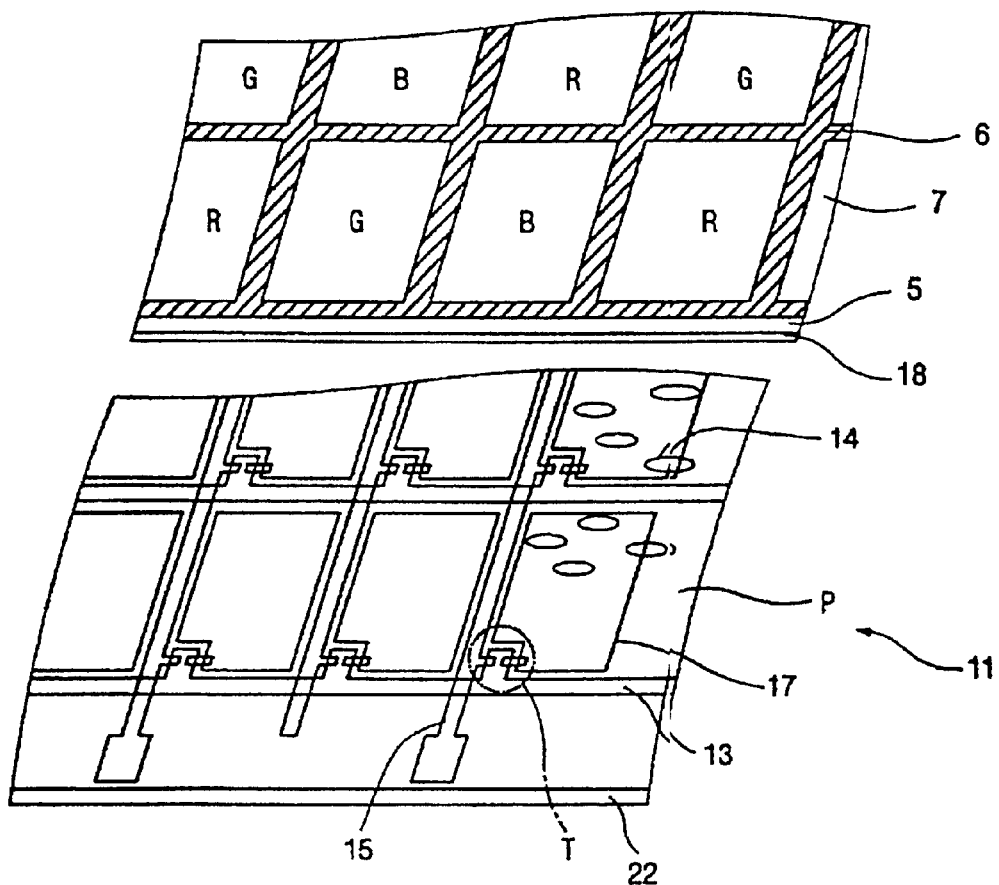
FIGS. 1A and 1B are a schematic views illustrating a typical liquid crystal display device.
Figure 1B:
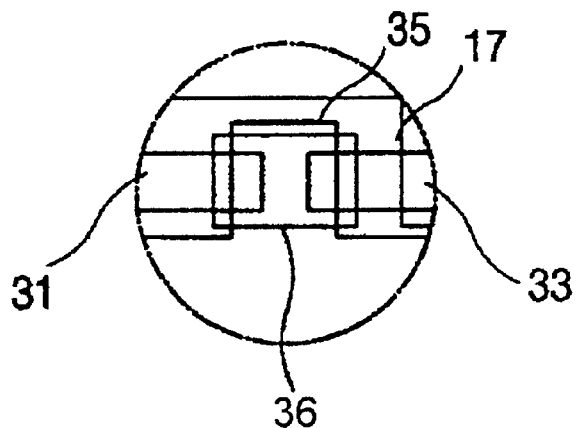
Figure 2:
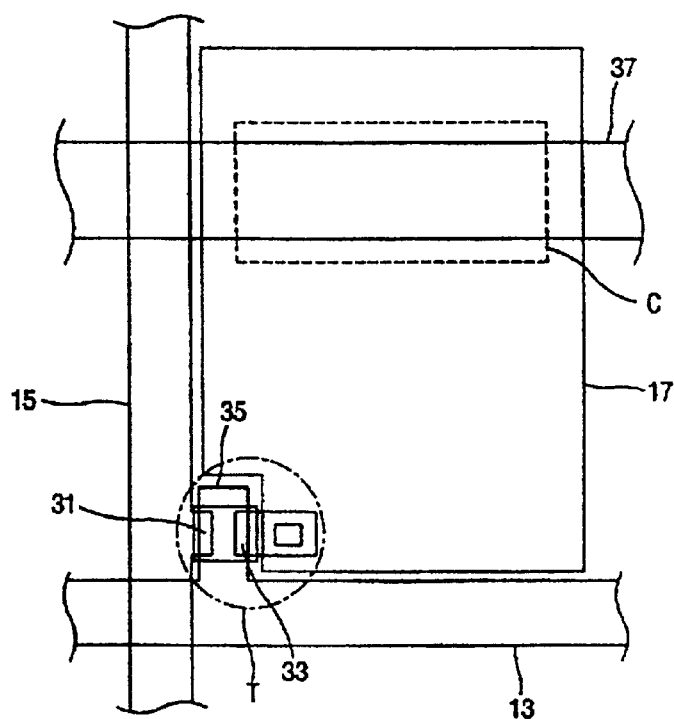
FIG. 2 is a plan view illustrating a conventional liquid crystal display device having a storage capacitor.
Figure 3:
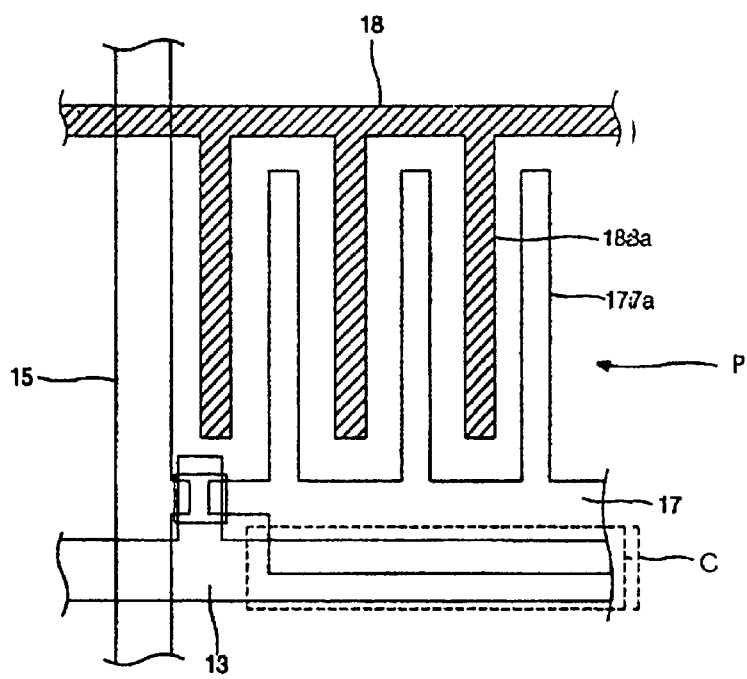
FIG. 3 is a plan view illustrating a conventional in-plane switching (IPS) type liquid crystal display device having a storage capacitor.
Figure 4:
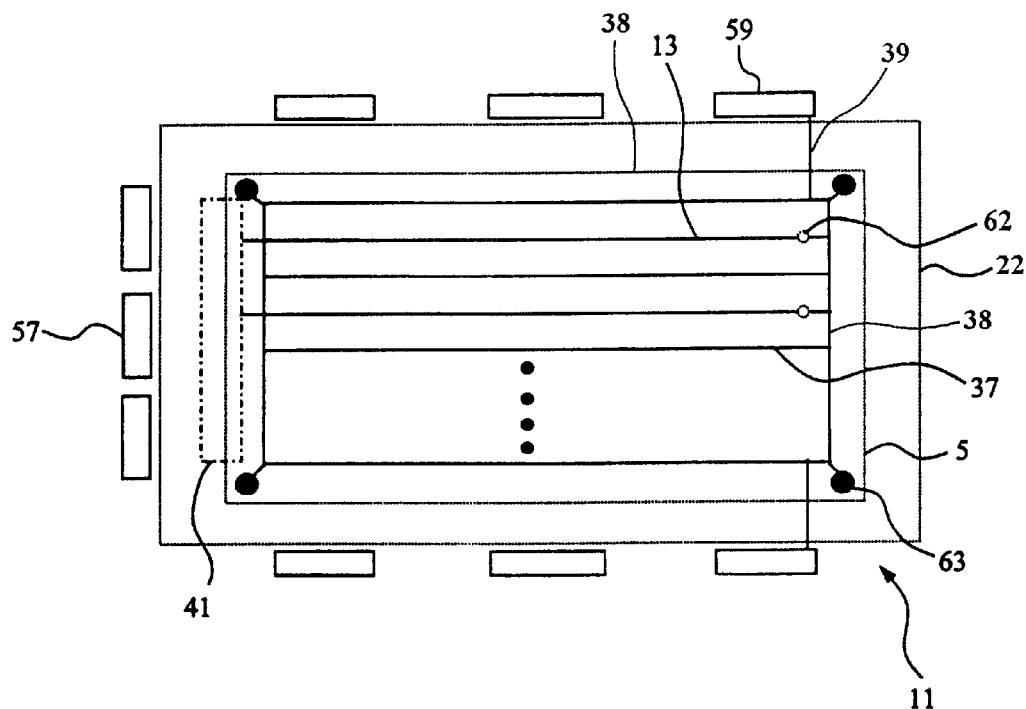
FIG. 4 is a plan view illustrating a structure of gate lines and capacitor electrode lines of the liquid crystal display device shown in FIG. 2.
Figure 5:
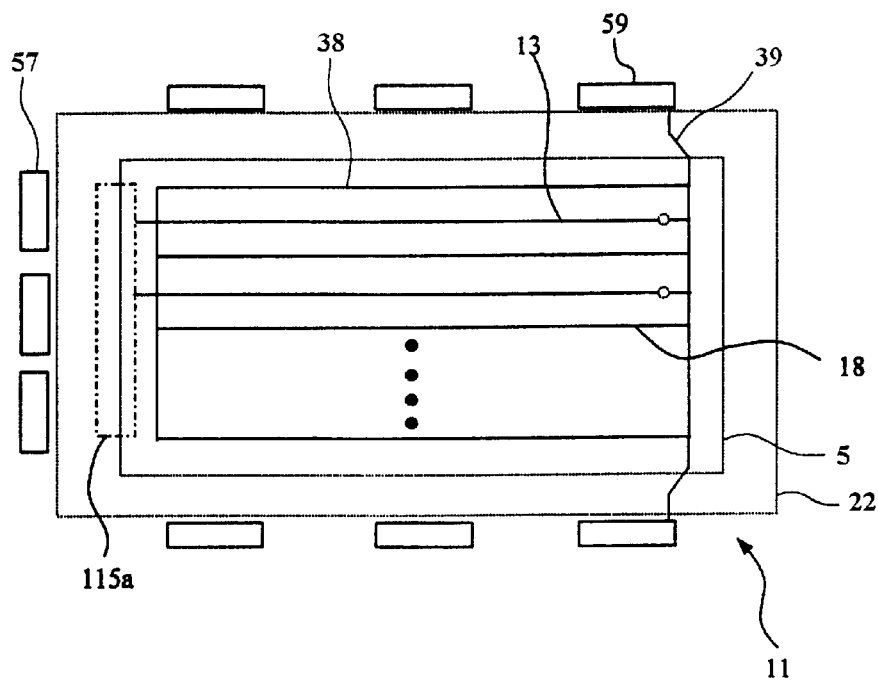
FIG. 5 is a plan view illustrating a structure of gate lines and common electrode lines of the IPS type liquid crystal display device shown in FIG. 3.
Figure 6:
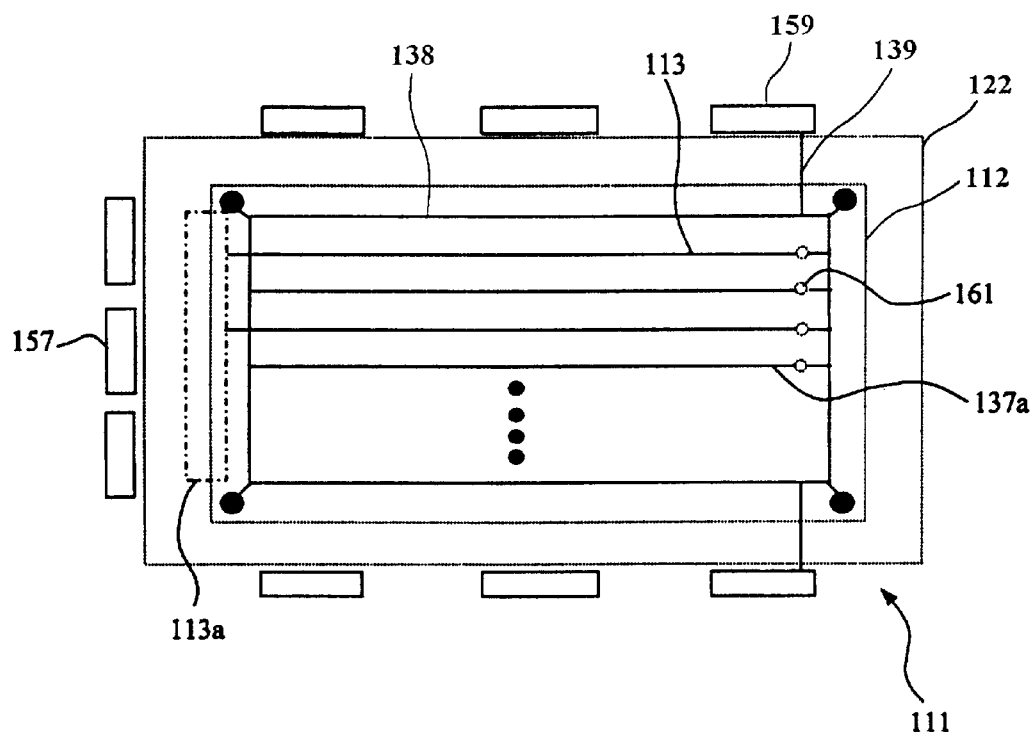
FIG. 6 is a plan view illustrating a structure of gate lines and capacitor electrode lines of a liquid crystal display device according to a preferred embodiment of the present invention.

FIG. 6 is a plan view illustrating a structure of gate lines and capacitor electrode lines of a LCD device according to a preferred embodiment of the present invention. As shown in FIG. 6, the LCD device 111 includes an upper substrate 112 and a lower substrate 122. The upper substrate 112 includes a common electrode (reference 18 of FIG. 1). The lower substrate 122 includes gate lines 113 arranged in a first (e.g., horizontal) direction, data lines (reference 15 of FIG. 1) arranged in a direction perpendicular to the gate lines 113. The gate lines 113 are electrically connected with the gate driver 157 through gate pads 113a located on a first end portion of the lower substrate 122, and the data lines are electrically connected with the data driver 159 through data pads (not shown). Each gate line 113 has an electrostatic circuit 161 at second end portions thereof opposite to the gate pads 113a.

In FIG. 6, the lower substrate 122 further includes capacitor electrode lines 137a arranged in a direction parallel to the gate lines 113. The capacitor electrode line 137a is electrically connected with dot patterns 163 made of Ag paste, which are located at four corners of the lower substrate 122 for connection with the common electrode (reference 18 of FIG. 1) of the upper substrate 112. First end portions of the capacitor electrode lines 137a adjacent to the gate pad 113a are electrically connected with each other, and second end portions of the capacitor electrode lines 137a have electrostatic circuits 161. The electrostatic circuits 161 serve to electrically separate the second end portions of the capacitor electrode lines 137a opposite to the gate pad portion 113a. Specifically, each electrostatic circuit 161 preferably includes two diodes connected in one direction. Further, each diode of the electrostatic circuit 161 is preferably a TFT, where a gate electrode and a drain electrode thereof are electrically connected with each other such that the TFT serves as a diode. The electrostatic circuit 161 serves as a nonlinear resistance such that electric discharge occurs more slowly along the capacitor electrode line 137a.

Figure 7:
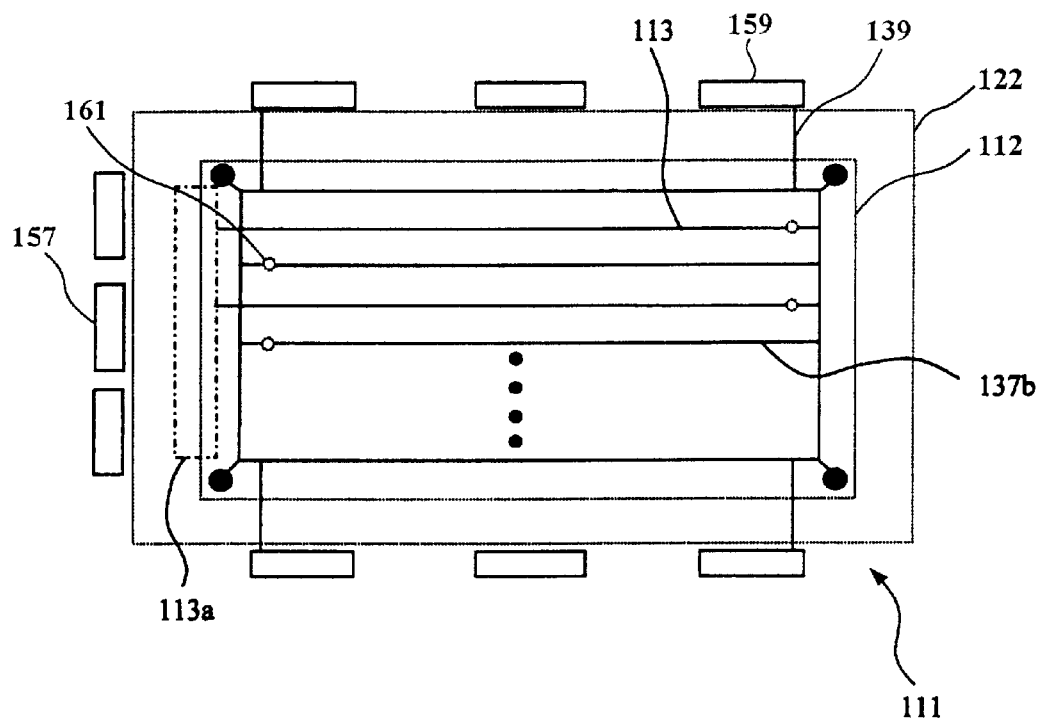
FIG. 7 is a plan view illustrating a modified structure of gate lines and capacitor electrode lines of the liquid crystal display device according to the preferred embodiment of the present invention.

The capacitor electrode lines 137a are connected with an auxiliary capacitor electrode line 138, which is connected with the data drivers 159 via connecting lines 139. When a capacitor voltage is applied to the capacitor electrode line 137a, a current flows in one direction, i.e., from the first end portion the adjacent to the gate pad 113a to the electrostatic circuit 161. Therefore, the capacitor electrode lines 137a have the lowest voltage level at their second end portions adjacent to the electrostatic circuit 161. Since a portion that a gray level becomes lowest is not located on a central portion of a screen but the edge portion of a screen, display characteristics can be improved remarkably. The electrostatic circuit 161 of the capacitor electrode line 137b, as shown in FIG. 7, may be located on a location adjacent to the gate pad 113a. This also shows improved display characteristics.

Figure 8:
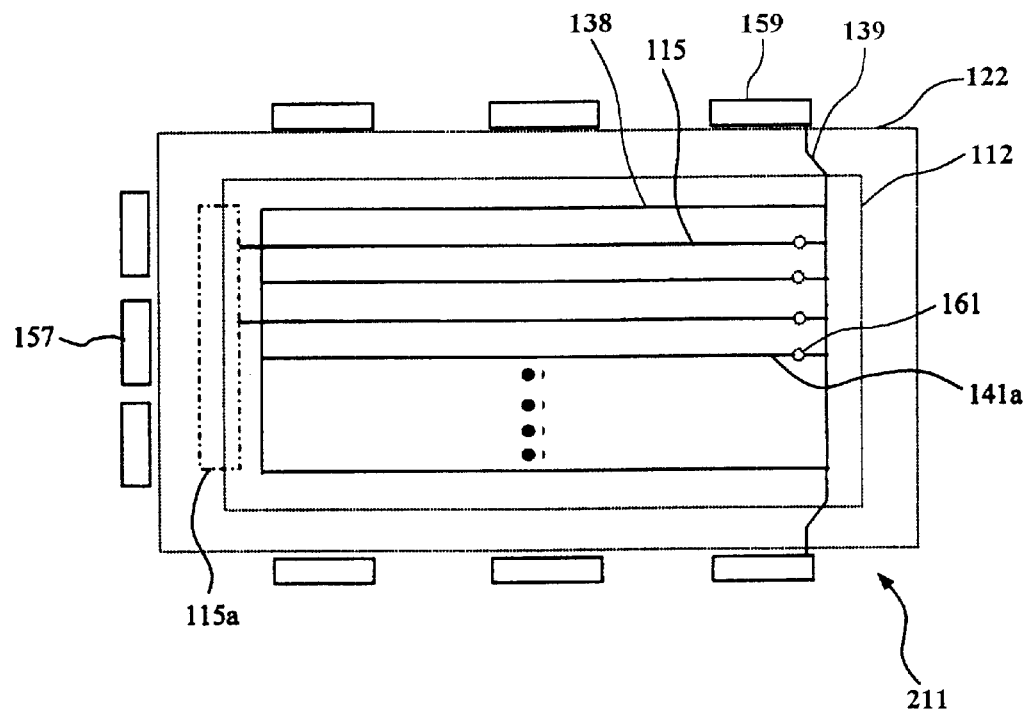
FIG. 8 is a plan view illustrating a structure of gate lines and common electrode lines of an IPS type liquid crystal display device according to the preferred embodiment of the present invention.

FIG. 8 is a plan view illustrating a structure of gate lines and common electrode lines of an IPS type liquid crystal display device 211 according to the preferred embodiment of the present invention. As shown in FIG. 8, common electrode lines 141a of the IPS type LCD device 211 are arranged in a direction parallel to the gate lines 115. The common electrode lines 141a have electrostatic circuits 161, which are located on first end portions opposite to the gate pad 115a. Second end portions of the common electrodes 141a are electrically connected with each other. Just like the capacitor electrode lines 137a and 137b of the LCD device shown in FIGS. 6 and 7, when a capacitor voltage is applied to the common electrode line 18 through the data drivers 59 respectively arranged on upper and lower regions of the lower substrate 200, a current flows in one direction, i.e., from second end portions adjacent to the gate pad 115a to the electrostatic circuit 161 (in the case of FIG. 8), which is the same direction as a direction to which signals of the gate line are applied. Therefore, a capacitor voltage level gets to become lowest near the electrostatic circuit 161. As a result, a gray level does not become lowest at the central portion of a screen but the edge of a screen, whereby display characteristics of the IPS type LCD device can be much improved.

Figure 9:
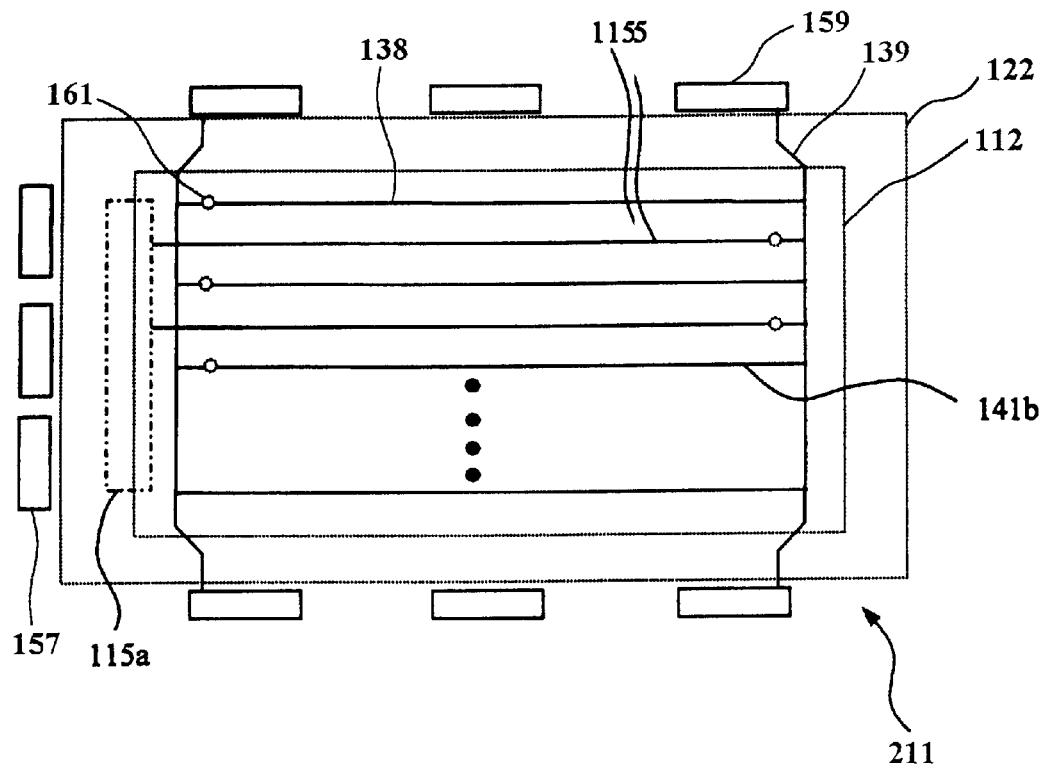
FIG. 9 is a plan view illustrating a modified structure of gate lines and common electrode lines of the IPS type liquid crystal display device according to the preferred embodiment of the present invention.

The electrostatic circuits 161 of the common electrode lines 141b, as shown in FIG. 9, may be located at positions adjacent to the gate pad 115a. However, since the IPS type LCD device 211 has common electrodes 141b and a pixel electrode (not shown) on the same substrate, i.e., the lower substrate 122, it is preferred that a direction to which a voltage is applied is the same direction as for the signals of the gate line. In other words, it is preferred that the common electrode lines 141 have an electrostatic circuit 161 located at a position opposite to the gate pad 115 as in FIG. 8.

As described herein before, using an LCD device having a structure of a capacitor electrode line and a common electrode line according to the preferred embodiment of the present invention, since a gray level becomes lowest at the edge of a screen, display characteristics can be improved remarkably.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display device, comprising:
    a first substrate;
    a second substrate spaced from the first substrate, having gate lines arranged in a first direction, data lines arranged in a direction perpendicular to the gate lines, capacitor electrode lines arranged in a direction parallel to the gate lines, each of the gate lines having electrostatic circuits located on second end portions thereof, first end portions of the gate lines having pad portions, each of the capacitor electrode lines having electrostatic circuits located on a second end portions thereof, first end portions of the capacitor electrode lines being electrically connected with each other;

a liquid crystal layer interposed between the first and second substrates;

gate driver units electrically connected with the gate lines through the pad portions of the gate lines; and data driver units electrically connected with the data lines, wherein the electrostatic circuits of the gate lines electrically separate the second end portions of the gate lines from each other, and the electrostatic circuits of the capacitor electrode lines electrically separate the second end portions of the capacitor electrode lines from each other.

2. The liquid crystal display device of claim 1, wherein second end portions of the capacitor electrode lines are located opposite to the pad portions of the gate lines.

3. The liquid crystal display device of claim 1, wherein the second substrate further includes pixel electrodes located on regions defined by the gate and data lines.

4. The liquid crystal display device of claim 1, wherein the second substrate further includes insulating layers interposed between the capacitor electrode lines and the pixel electrode so that the capacitor electrode line, the insulating layer and the pixel electrode form a storage capacitor.

5. The liquid crystal display device of claim 1, wherein the first substrate has a common electrode, and the second substrate has four dot patterns located on four corners thereof, wherein the four dot patterns are connected with the capacitor electrode lines and the common electrode of the first substrate.

6. The liquid crystal display device of claim 5, wherein the dot pattern is made of Ag paste.

7. The liquid crystal display device of claim 1, wherein each electrostatic circuit comprises two diodes connected in one direction.

8. A liquid crystal display device, comprising:

a first substrate;

a second substrate spaced apart from the substrate, having gate lines arranged in a first direction, data lines arranged in a direction perpendicular to the gate lines, common electrode lines arranged in a direction parallel to the gate lines, and pixel electrodes, the gate lines having electrostatic circuits located on first end portions thereof, second end portions of the gate lines having pad portions, the common electrode lines having electrostatic circuits located on first end portions thereof, second end portions of the common electrode lines being electrically connected with each other, the common electrode having branches, the pixel electrode having branches, the branches of the common electrode being equidistantly interposed between the branches of the pixel electrode;

a liquid crystal layer interposed between the first and second substrate;

gate driver units electrically connected with the gate lines through the pad portion of the gate lines; and data driver units electrically connected with the data lines, wherein the electrostatic circuits of the gate lines electrically separate the first end portions of the gate lines from each other, and the electrostatic circuits of the capacitor electrode lines electrically separate the first end portions of the capacitor electrode lines from each other.

9. The liquid crystal display device of claim 8, wherein the first end portions of the common electrode lines are located adjacent to the pad portions of the gate lines.

10. The liquid crystal display device of claim 1, wherein the first substrate has a common electrode, and the second substrate has four dot patterns located on four corners thereof, wherein the four dot patterns are connected with the capacitor electrode lines and the common electrode of the first substrate.

11. The liquid crystal display device of claim 5, wherein the dot pattern is made of Ag paste.

12. The liquid crystal display device of claim 1, wherein second end portions of the capacitor electrode lines are located adjacent to the pad portions of the gate lines.

13. The liquid crystal display device of claim 8, wherein the first end portions of the common electrode lines are located opposite to the pad portions of the gate lines.

14. The liquid crystal display device of claim 7, wherein each diode is a TFT having a gate electrode electrically connected to a drain electrode.

15. The liquid crystal display device of claim 8, wherein each electrostatic circuit comprises two diodes connected in one direction.

16. The liquid crystal display device of claim 15, wherein each diode is a TFT having a gate electrode electrically connected to a drain electrode.

* * * * *